Patented July 21, 1931

1,815,133

UNITED STATES PATENT OFFICE

OTTO SOHST, OF HOCHST-ON-THE-MAIN, GERMANY, ASSIGNOR TO GENERAL ANILINE WORKS, INC., OF NEW YORK, N. Y., A CORPORATION OF DELAWARE

NEW AZO DYESTUFFS AND PROCESS OF PREPARING THEM

No Drawing. Application filed December 11, 1926, Serial No. 154,310, and in Germany December 15, 1925.

The present invention relates to new azo dyestuffs and to a process of preparing the same, and more particularly relates to azo dyestuffs having the general formula:

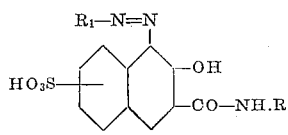

wherein R and $R_1$ represents aryl residues which may be substituted.

I have found that valuable azo dyestuffs of a bright shade and of good properties as to fastness can be obtained by coupling any diazo compound with a sulfonic acid of the general formula

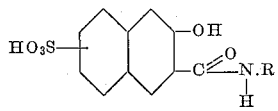

wherein R represents any aryl residue which may be substituted or not, which sulfonic acids may be produced by treating an arylide of 2.3-hydroxynaphthoic acid with sulfuric acid as described in U. S. Patent No. 1,477,014. According to the components used, the dyestuffs obtained are suitable for dyeing animal or vegetable fibres; they may also be used for the preparation of color lakes and may, if desired, be produced on the fibre.

The following examples serve to illustrate my invention, but they are not intended to limit it thereto, all parts being by weight:

(1) 9.3 parts of aniline are diazotized in the usual manner by treatment with a solution of 7 parts of sodium nitrite, and the resulting diazo solution is run into a solution, rendered alkaline with sodium carbonate, of the sulfonic acid prepared by sulfonating 26.3 parts of 2-hydroxynaphthalene-3-carboxylic acid anilide. After the mass has been stirred for several hours the separation of the dyestuff is completed by adding common salt, whereupon the dyestuff is filtered off and dried. It dyes wool an orange-red tint of relatively good fastness to washing and light.

This dyestuff product has most probably the formula

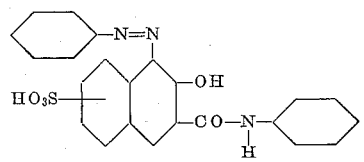

If there are substituted for instance for the aniline equivalent quantities of orthophenetidine or meta-xylidine and for hydroxynaphthoic acid-anilide-sulfonic acid the sulfonic acids from 2-hydroxynaphthalene-3-carboxylic acid-ortho-toluidide or- (4'-chloro-1'-methoxy-2'-)-anilide, bluish-red dyestuffs are obtained having good properties as to fastness.

(2) 15.1 parts of 4-nitro-2-amino-1-methylbenzene are diazotized in the usual manner with 7 parts of sodium nitrite and the resulting diazo compound is coupled with a solution, rendered alkaline with sodium carbonate, of the sulfonic acid prepared by sulfonating 31 parts of 2-hydroxynaphthalene-3-carboxylic acid (5'-chloro-2'-methyl-1'-)anilide. In this manner a ruby-red dyestuff is obtained which is difficultly soluble in water and which can be made up in the usual manner into a color lake.

The dyestuff has most probably the formula:

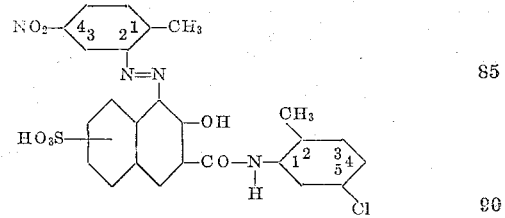

(3) 21.2 parts of meta-aminobenzoic acid-anilide are diazotized in the usual manner and the resulting diazo compound is coupled with a solution, rendered alkaline with sodium carbonate, of a sulfonic acid prepared by sulfonating 26.3 parts of 2-hydroxynaphthalene-3-carboxylic acid-anilide. A dyestuff is obtained dyeing wool yellowish-red tints and possessing besides a good levelling power good properties as to fastness.

The dyestuff has most probably the formula

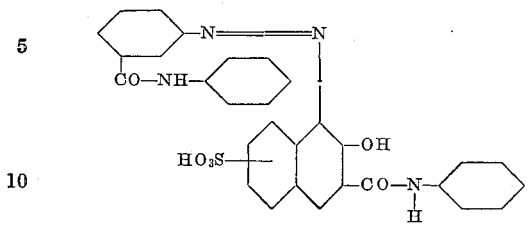

A very similar dyestuff is obtained by using meta-aminobenzaldehyde instead of meta-aminobenzoic acid-anilide.

(4) 17.3 parts of aniline-ortho-sulfonic acid are diazotized in the usual manner and the resulting diazo compound is coupled with a solution, rendered alkaline with sodium carbonate, of the sulfonic acid prepared by sulfonating 26.3 parts of 2-hydroxynaphthalene-3-carboxylic acid-anilide. The dyestuff is salted out, pressed and dried. It dyes wool red tints.

The dyestuff has most probably the formula

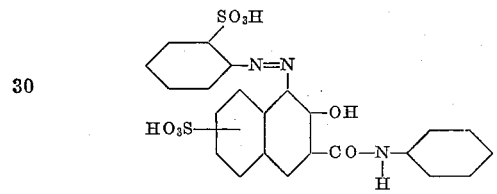

(5) 12.2 parts of dianisidine are tetrazotized in the usual manner and the resulting tetrazo-compound is coupled with a solution, rendered alkaline with sodium carbonate, of the sulfonic acid prepared by sulfonating 27.7 parts of 2-hydroxynaphthalene-3-carboxylic acid-ortho-toluidide. After the mass has been stirred for several hours it is heated to 60° C., then salted out, pressed and dried. The dyestuff thus obtained dyes cotton bluish violet tints. It has most probably the formula:

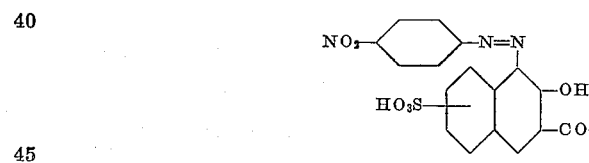

(6) 29.1 parts of 2-ethoxylbenzene-1-azo-α-naphthylamine are diazotized in the usual manner and the diazo solution is coupled with a solution, rendered alkaline with sodium carbonate, of the sulfonic acid prepared by causing sulfuric acid-monohydrate to act upon 31.3 parts of 2-hydroxynaphthalene-3-carboxylic-acid-β-naphthylamide according to the process described in the above-cited U. S. Patent No. 1,477,014. The black precipitate is filtered off, washed with a dilute solution of common salt, pressed and dried. It is easily soluble in hot water and dyes wool a black tint.

The dyestuff has most probably the formula

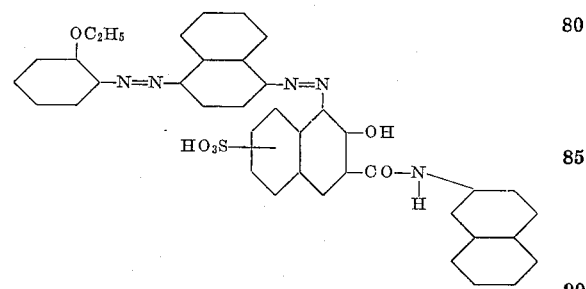

(7) Cotton material is impregnated with a solution, rendered alkaline with caustic alkali, of the sulfonic acid prepared by treating with sulfuric acid the arylamide from two molecules of 2-hydroxynaphthalene-3-carboxylic acid and one molecule of benzidine. After some time the material is wound off and developed in the presence of sodium acetate with a diazo solution prepared by diazotizing para-nitraniline. In this manner a brownish-red tint is obtained of remarkable fastness.

The dyestuff has most probably the formula

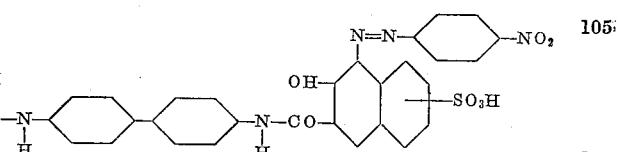

(8) 6.5 parts of 4-chloro-2-amino-diphenylether are diazotized in the usual manner with 1.8 parts of sodium nitrite and about 10 parts of hydrochloric acid of 20° Bé. The resulting diazo solution is run into a solution, rendered alkaline with sodium carbonate, of 9 parts of 2-hydroxynaphthalene-sulfonic acid-3-carboxylic acid-ortho-toluidide. Thus a red precipitate is produced, which can be filtered off and dried. The resulting product is a dyestuff having most probably the formula

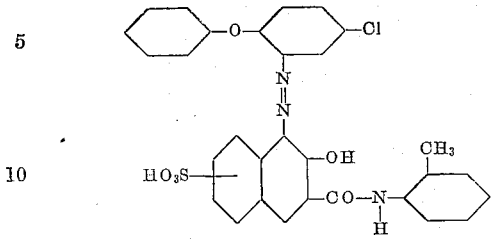

It dyes wool red tints fast to fulling and to light. The dyestuff may also be made up into a color lake.

If in the preceding example the 2-hydroxynaphthalene-sulfonic acid-3-carboxylic acid-ortho-toluidide is replaced by an equivalent quantity of 2-hydroxynaphthalene-sulfonic acid-3-carboxylic acid-meta-nitranilide, a red dyestuff is obtained of a somewhat more bluish shade.

(9) 5 parts of 2-amino-4-nitro-1-benzoic acid-methylester are diazotized in the usual manner and the resulting diazo solution is coupled with a solution, rendered alkaline with sodium carbonate, of 2-hydroxynaphthalene-sulfonic acid-3-carboxylic acid-ortho-toluidide or -chlor-ortho-toluidide or -meta-nitranilide. In this manner red dyestuffs are obtained, which dye wool very fast tints and which are suitable for the preparation of color lakes.

The dyestuff obtained by the use of the above-described ortho-toluidide has most probably the formula

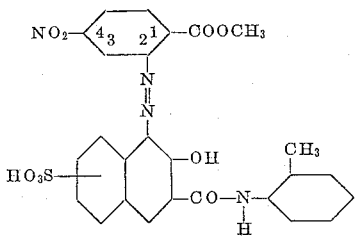

When the chlor-ortho-toluidine is substituted for the above, the resulting dyestuff seems to have the probable formula

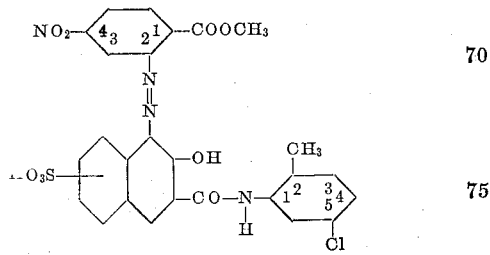

When the meta-nitranilide is substituted for ortho-toluidide, the resulting dyestuff seems to have the probable formula

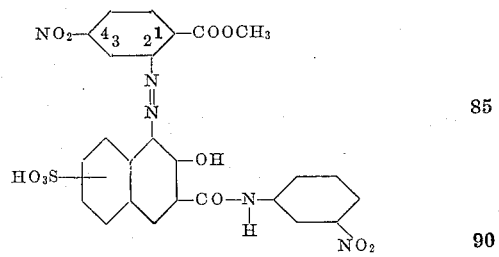

(10) 5 parts of para-para'-diaminodiphenylmethane are dissolved in water with 15 parts of hydrochloric acid of 20° Bé. and diazotized in the cold with 3.5 parts of sodium nitrite. The resulting diazo solution is run into a solution, rendered alkaline with sodium carbonate, of 17.2 parts of 2-hydroxynaphthalene-sulfonic acid-3-carboxylic acid-anilide. The dyestuff thus produced is salted out and dried. It dyes wool red tints fast to fulling and to light.

The dyestuff has the probable formula

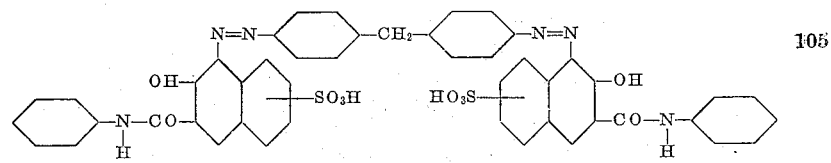

(11) 2.8 parts of para-para'-diaminodiphenyldimethylmethane are diazotized with 7.5 parts of hydrochloric acid of 20° Bé. and 1.8 parts of sodium nitrite and the resulting diazo solution is coupled with a solution, rendered alkaline with sodium carbonate, of 8.9 parts of 2-hydroxynaphthalenesulfonic acid-3-carboxylic acid-ortho-toluidide. The dyestuff thus produced is salted out and dried. It dyes wool red tints fast to fulling and to light.

The resulting dyestuff has the probable formula

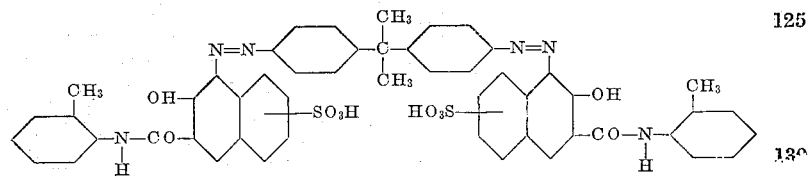

If in the preceding example the para-para'-diaminodiphenyldimethylmethane is replaced by an equivalent quantity of para-para'-diaminoditolyldimethylmethane, a similar red dyestuff is obtained.

All these dyestuffs may be split up by reduction into the starting base which has been used for the diazotization and into 1-amino-2-hydroxynaphthalenesulfonic acid-3-carboxylic acid-arylamide.

The color of the solution of the dyestuffs in sulfuric acid depends on the nature of the base used for the diazotization and coupling process and varies between red, violet and greenish-blue.

I claim:

1. As new products the azo dyestuffs having the general formula

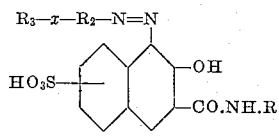

wherein R, $R_2$ and $R_3$ represent aryl residues or $R_3$ stands for the residue:

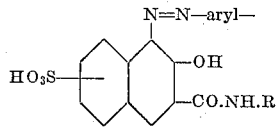

(R meaning an aryl residue)

and $x$ represents oxygen, the group $-N=N-$, or a group

in which $y$ represents one of the substituents of the group hydrogen and alkyl.

2. As new products the azo dyestuffs of the general formula

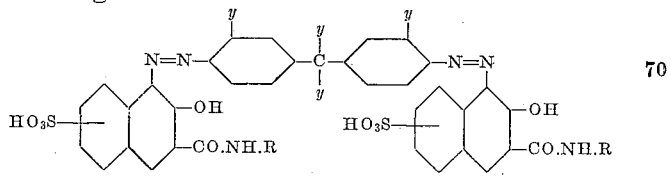

wherein R represents an aryl residue, and $y$ represents hydrogen or any alkyl group.

3. As new products the azo dyestuffs of the general formula

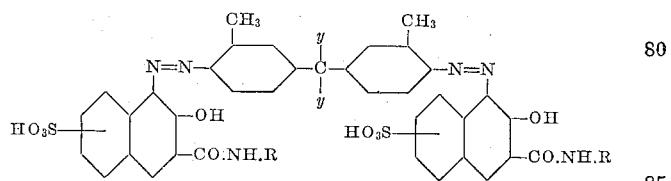

wherein R represents an aryl residue, and $y$ represents hydrogen or a methyl group.

4. As new products the azo dyestuffs having the general formula

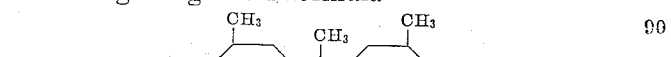

wherein R represents an aryl residue.

5. As new products the azo dyestuffs of the general formula

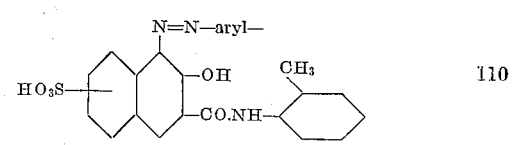

wherein $R_2$ and $R_3$ represent aryl residues or $R_3$ stands for the residue:

and $x$ represents oxygen, the group $-N=N-$, or a group in which $y$ represents one of the substituents of the group hydrogen and alkyl.

6. As new products the azo dyestuffs of the general formula

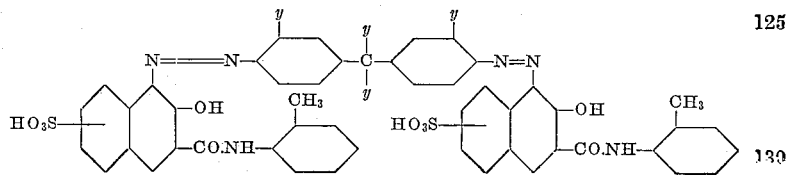

wherein $y$ represents hydrogen or an alkyl group.

7. As new products the azo dyestuffs of the general formula

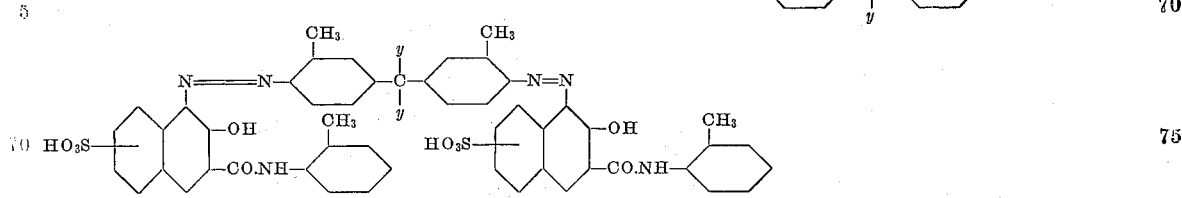

wherein $y$ represents hydrogen or a methyl group.

8. As a new product the azo dyestuff of the formula

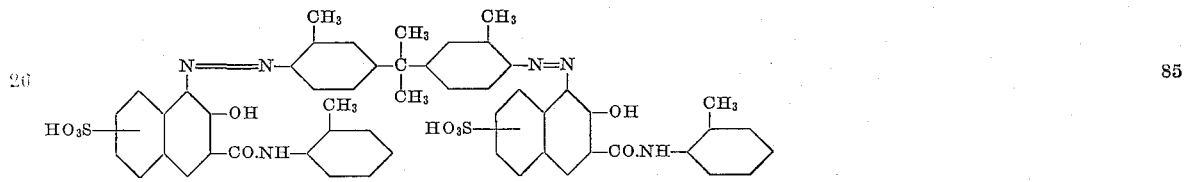

9. The process of preparing new azo dyestuffs, which consists in coupling a diazo compound of the general formula

wherein $x$ represents oxygen, the group $-N=N-$, or a group

in which $y$ represents one of the substituents of the group hydrogen and alkyl, and $R_2$ and $R_3$ represent aryl radicals, at least one of them being substituted by a diazo group with a compound of the general formula

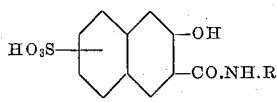

wherein R represents an aryl residue.

10. The process of preparing new azo dyestuffs, which consists in tetrazotizing a compound of the general formula

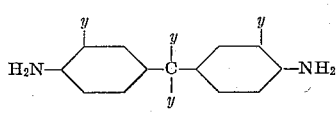

wherein $y$ represents hydrogen or an alkyl group, and coupling the diazo compound thus obtained with 2 mols of the compound of the general formula

wherein R represents an aryl residue.

11. The process of preparing new azo dyestuffs, which consists in tetrazotizing the compound of the general formula

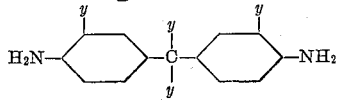

wherein $y$ represents hydrogen or an alkyl group, and coupling the diazo compound thus obtained with 2 mols of the compound of the formula

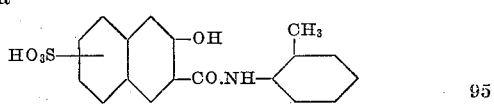

12. The process of preparing a new azo dyestuff, which consists in tetrazotizing 1 mol of 4.4'-diamino-3.3'-dimethyl-diphenyl-dimethyl-methane and coupling the diazo compound thus obtained with 2 mols of the compound of the formula

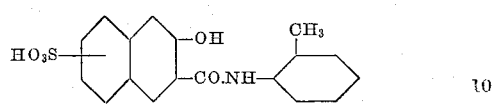

In testimony whereof, I affix my signature.
OTTO SOHST.

CERTIFICATE OF CORRECTION.

Patent No. 1,815,133.  Granted July 21, 1931, to

OTTO SOHST.

It is hereby certified that error appears in the printed specification of the above numbered patent requiring correction as follows: Page 4, between lines 115 and 120, under the "C" insert a dash and the letter y; and that the said Letters Patent should be read with this correction therein that the same may conform to the record of the case in the Patent Office.

Signed and sealed this 22nd day of September, A. D. 1931.

(Seal)

M. J. Moore,
Acting Commissioner of Patents.